United States Patent [19]
Maloney

[11] Patent Number: 4,783,680
[45] Date of Patent: Nov. 8, 1988

[54] HALFTONE SCREENING SYSTEM FOR PRINTER/COPIER

[75] Inventor: Thomas O. Maloney, Webster, N.Y.

[73] Assignee: Xerox Corporation, Stamford, Conn.

[21] Appl. No.: 103,007

[22] Filed: Sep. 30, 1987

[51] Int. Cl.⁴ .............................................. G03G 15/22
[52] U.S. Cl. ...................................... 355/8; 355/3 R;
  358/298; 346/76 L; 346/160
[58] Field of Search ................. 355/3 R, 8; 346/76 L,
  346/108, 160; 358/296, 298

[56] References Cited
U.S. PATENT DOCUMENTS

| | | | |
|---|---|---|---|
| 4,227,795 | 10/1980 | Bobbe et al. | 355/3 R |
| 4,234,250 | 11/1980 | Mailloux et al. | 355/3 R X |
| 4,294,534 | 10/1981 | Snelling | 355/8 |
| 4,378,156 | 3/1983 | Yajima et al. | 355/77 |
| 4,517,579 | 5/1985 | Kitamura | 355/3 R X |
| 4,572,647 | 2/1986 | Bean et al. | 355/3 R |
| 4,641,200 | 2/1987 | Shoji et al. | 358/296 |

*Primary Examiner*—Arthur T. Grimley
*Assistant Examiner*—Jane K. Lau
*Attorney, Agent, or Firm*—Frederick E. McMullen

[57] ABSTRACT

A copier/printer with a light/lens system providing copies of documents, a raster output scanner providing prints in response to image signals, a source of screen image signals, and control means for operating both the light/lens system and the raster output scanner together while accessing the screen image signals so that the raster output scanner creates a dot matrix screen on the photoreceptor over which the latent image of the document being copied is placed by the light/lens system.

6 Claims, 4 Drawing Sheets

HALFTONE SCREENING SYSTEM FOR PRINTER/COPIER

This invention relates to copier/printer machines, and more particularly, to an improved halftone screening system for screening copies produced by such machines.

Combination copier/printers, referred to generally as dual mode machines, can be selectively operated in a first mode to make copies of document originals or in a second mode to make prints of images input to the machine in the form of image signals or pixels. Machines of this type are often based on zerographic principles where the recording member consists of a photoreceptor that is charged to a uniform level preparatory to imaging. The charged photoreceptor is exposed so that there is created on the photoreceptor surface a latent electrostatic image which is then developed with a suitable developer and transferred to a copy substrate material such as a copy sheet brought forward in timed relation with the image developed on the photoreceptor. Following transfer, the copy sheet, now bearing the transferred image, is fixed as by fusing while the photoreceptor is cleaned of any leftover developer or other debris.

It is sometimes advantageous or desirable, where the document being copied is a pictorial document, to enhance the copy by screening the image. The process of screening is typically carried out in one of two ways. In one, generally termed multiplicative in the art, the light image of the original document is transmitted directly though a screen during exposure. The screen modulates or divides the light image to form a halftone image. In the second approach, termed sequential, a light image of a screen pattern exposes the charged surface of the photoreceptor. The light image of the original document being copied is projected onto the screened area of the photoreceptor in superimposed relation thereto. As a result, the electrostatic latent image is finely divided by the screen pattern. In this type of screening, the screen and light source associated therewith may be disposed prior to or subsequent to the projection of the light image of the original document onto the photoreceptor.

One example of sequential screening of the type alluded to above is disclosed in U.S. Pat. No. 4,227,795 to Bobbe et al. There, a transparent generally rectangular screen member having a predetermined pattern of opaque dots is optically coupled with a light source, the assembly being spaced from and astride the path of movement of the photoreceptor at a point upstream of the exposure station. A control system is provided to actuate the light source each time the photoreceptor moves a predetermined incremental distance, actuation of the light source illuminating the screen member to expose the charged photoreceptor to the light pattern represented by the screen. The latent electrostatic image of the document being copied is formed over the latent electrostatic screen pattern, resulting in a screened image.

In a related type of structure, U.S. Pat. No. 4,378,156 to Yajima et al discloses a dual mode copier/printer incorporating a mechanism to control or eliminate the black banding that can occur when shifting from one operating mode to the other. And, in a further related prior art disclosure, U.S. Pat. No. 4,641,200 to Shoji et al discloses, in their FIGS. 9-11 embodiments, a dual mode copier/printer in which both the light/lens copies and the raster output scanner are used to produce overlapping latent images at different charge levels. This allows two-color development of the image through the use of two different color developers, each responsive to a different charge level.

In contrast, the present invention provides a halftone screening system for copier/printers of the type having a movable recording member on which images are created, developed, and transferred to copy sheets to provide copies or prints selectively, comprising in combination: a raster output scanner for scanning the recording member to write images thereon in accordance with an image signal input, the raster output scanner including a beam of high intensity radiation, means for sweeping the beam across the recording member to write the images line by line, and means to modulate the beam in accordance with the image signal input; a light/lens system for scanning the recording member to copy a document image thereon, the light/lens system including an exposure slit, means for transporting the document across the exposure slit, illumination means for illuminating the exposure slit and the portion of the document thereover, and optical means forming an optical path for the image rays to the recording member; a source of image signals which write a dot matrix screen pattern on the recording member; and control means for actuating both the raster output scanner to write the dot matrix screen pattern provided by the image signal source on the recording member and the light/lens system to copy the document image on the recording member in overlapping relation to one another whereby to provide a screened copy of the document image.

Figure 1:
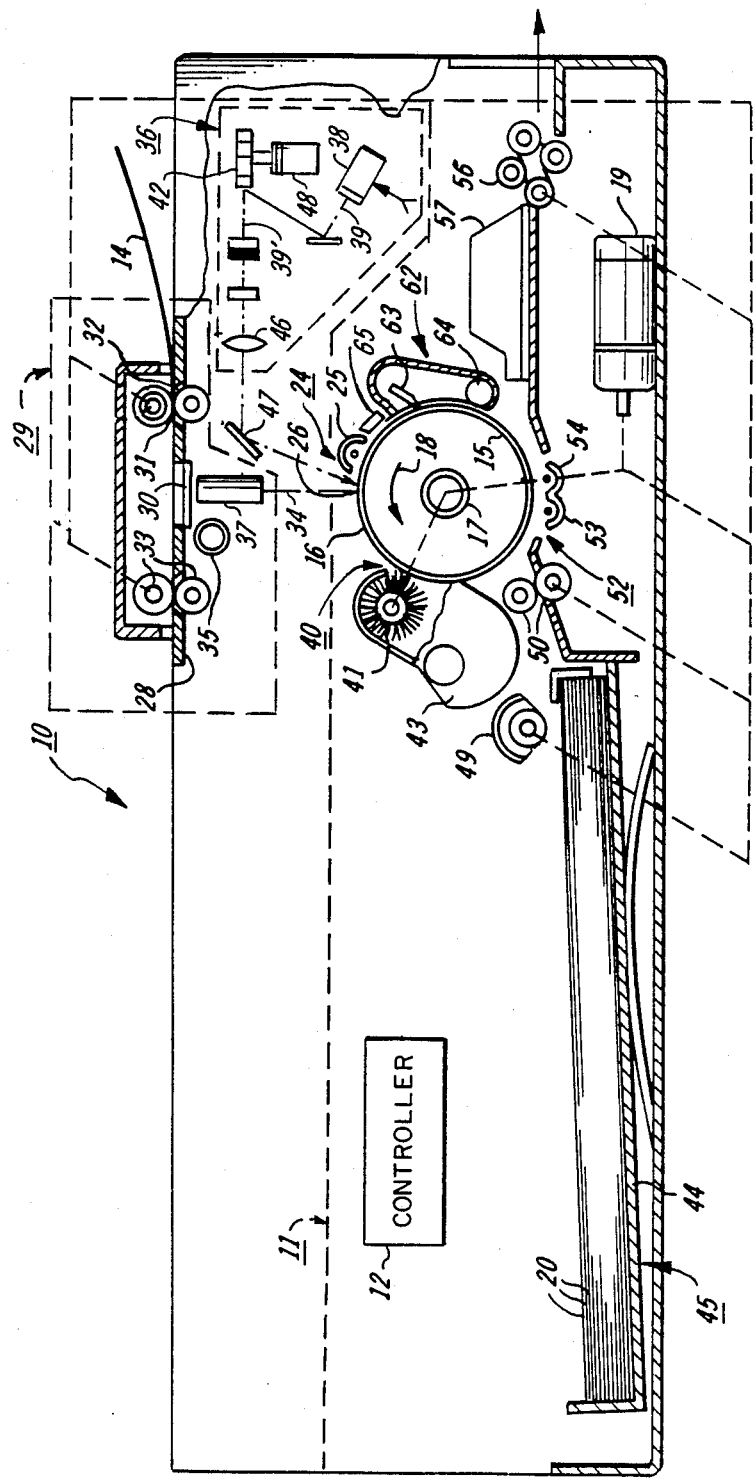
FIG. 1 is a side view depicting an exemplary copier/printer of the type adapted to incorporate the halftone screening system of the present invention.

Referring to FIG. 1 of the drawings, there is shown an exemplary copier/printer, designated generally by the numeral 10 of the type adapted to incorporate the halftone screening system of the present invention. Copier/printer 10 comprises a multi-mode machine having both copying and printing capabilities.

The copier/printer 10 depicted in FIG. 1 illustrates the various components utilized in a machine of this type for producing either copies of an original document 14 or prints derived from an image signal or pixel input. Although the halftone screening system of the present invention is particularly well adapted for use in copier/printer 10, it should become evident from the following description that the invention is equally well suited for use in a wide variety of other printer types and systems.

For purposes of description, copier/printer 10 is divided into a xerographic section 11, document handler-optic section 29, and raster output scanner section 36. Xerographic section 11 includes a photoreceptor 15 in the form of a drum having a suitable photoconductive material 16. Photoreceptor 15 is suitably supported for rotation within the machine frame (not shown) by shaft 17. A main drive motor 19 is drivingly coupled to photoreceptor 15, motor 19 rotating photoreceptor 15 in the direction indicated by arrow 18 to bring the photoconductive surface 16 of photoreceptor 15 past a series of xerographic processing stations.

A suitable microprocessor based controller 12 is provided for operating the various components that comprise copier/printer 10 in predetermined timed relationship with one another to make copies or prints upon a sheet of final support material such as copy sheets 20.

A suitable charging device such as scorotron 25 is provided at charging station 24 for uniformly charging the photoconductive surface 16 of photoreceptor 15 preparatory to imaging. During copying or printing, the uniformly charged photoconductive surface 16 is exposed at exposure station 26, creating a latent electrostatic image of the document original 14 (copy mode) or of the image represented by an image signal or pixel input (print mode) on photoreceptor 15.

Following exposure, the latent electrostatic image is developed at a development station 40. There, a suitable developer mix from developer housing 43 is brought into developing relation with the latent image by a magnetic brush roll 41 to develop the image and render the same visible. Magnetic brush roll 41 is drivingly coupled to main drive motor 19.

A supply of copy sheets 20 is provided in copy sheet supply tray 45. Suitable biasing means are provided to raise the base 44 of tray 45 so that the topmost sheet 20 in the stack of sheets is in operative relationship with segmented feed rolls 49. Feed rolls 49 are driven by main drive motor 19 through an electromagnetically operated clutch (not shown) such that upon engagement of the clutch, the topmost sheet is advanced forward into the nip of a registration roll pair 50. Registration roll pair 50, which are downstream of feed rolls 49, receive and register the copy sheet with the developed image on the photoconductive surface 16 of photoreceptor 15 while advancing the copy sheet forward to transfer station 52. At transfer station 52, suitable transfer/detack means such as transfer/detack corotrons 53, 54 bring the sheet into transfer relation with the developed image on the surface of photoreceptor 15 and thereafter separate or detack the sheet from the photoreceptor surface.

Following transfer station 52, the image bearing copy sheet is transported to a radiant type non-contact fuser 57 where the image is permanently fixed to the sheet. After fusing, the finished copy or print is discharged by transport roll pair 56 to a suitable receptacle such as an output tray (not shown). Registration roll pair 50 and transport roll pair 56 are driven by main drive motor 19 through suitable driving means such as belts and pulleys.

After transfer, residual developer remaining on the surface of photoreceptor 15 is removed at cleaning station 62 by cleaning blade 63 and deposited into a suitable collector 64 for removal. A suitable discharge lamp 65 neutralizes any residual charges on photoreceptor 15.

Document handler-optic section 29 provides a surface 28 for supporting a document 14 to be copied. Surface 28 has a scan aperture or slit 30 therethrough to permit the document to be scanned, the resulting image rays 34 exposing the photoconductive surface 16 of photoreceptor 15 at exposure station 26. A suitable document transport, exemplified here by a constant velocity roll pairs 32, 33 on each side of scan slit 30 provides scanning movement to the document. Roll pairs 32, 33 are drivingly coupled to main drive motor 19 through an electromagnetically operated clutch (not shown) which allows roll pairs 32, 33 to be selectively engaged and disengaged. A suitable document sensor 31 is provided at the document handler inlet for detecting the insertion of a document original 14 to be copied and initiating the scanning operation.

A lamp 35 is disposed below surface 28 to illuminate scan slit 30 and the line-like portion of the document 14 passing thereover during scanning. A suitable fiber optic type lens array 37 which may, for example, comprise an array of gradient index fiber elements, optically transmits image rays 34 reflected from the document to the photoconductive surface 16 of photoreceptor 15 at exposure station 26.

Raster output scanner section 36 includes a suitable source of high intensity radiation, shown here as laser diode 38. The high intensity beam 39 of light output by diode 38 is impinged on the mirrored surfaces of a rotating polygon 42 which reflects the beam, the rotating polygon sweeping the reflected beam 39' across photoreceptor 15 at right angles to the direction of movement of photoreceptor 15. Polygon 42 is driven by motor 48. Beam 39' is focused onto a spot on the surface of photoreceptor 15 by suitable optical means exemplified here by lens 46. A mirror 47 directs the beam 39 onto photoreceptor 15 at exposure station 26 at a point upstream of the point where the image rays 34 produced during the scanning cycle impinge on photoreceptor 15. The intensity of imaging beam 39' is modulated or controlled in response to the image content of the image signal or pixel input to the laser diode modulator driver.

While a polygon type scanning element is shown, other forms of scanning elements such as a holographic disk may be envisioned. And while a laser diode is shown and described, other suitable sources of high intensity radiation such as a gas type laser may be used. It is understood that where the radiation source comprises a gas laser, a separate modulator such as an acousto-optic modulator is required to modulate the laser beam in accordance with the image signal or pixels.

To enhance pictorial reproduction of continuous tone originals, a third operating mode, termed the screen mode, is provided. In this mode, which is in effect a combination of both the previously described copy and print modes, a halftone screen pattern is applied to the surface of photoreceptor 15 prior to scanning of document 14.

Figure 2:
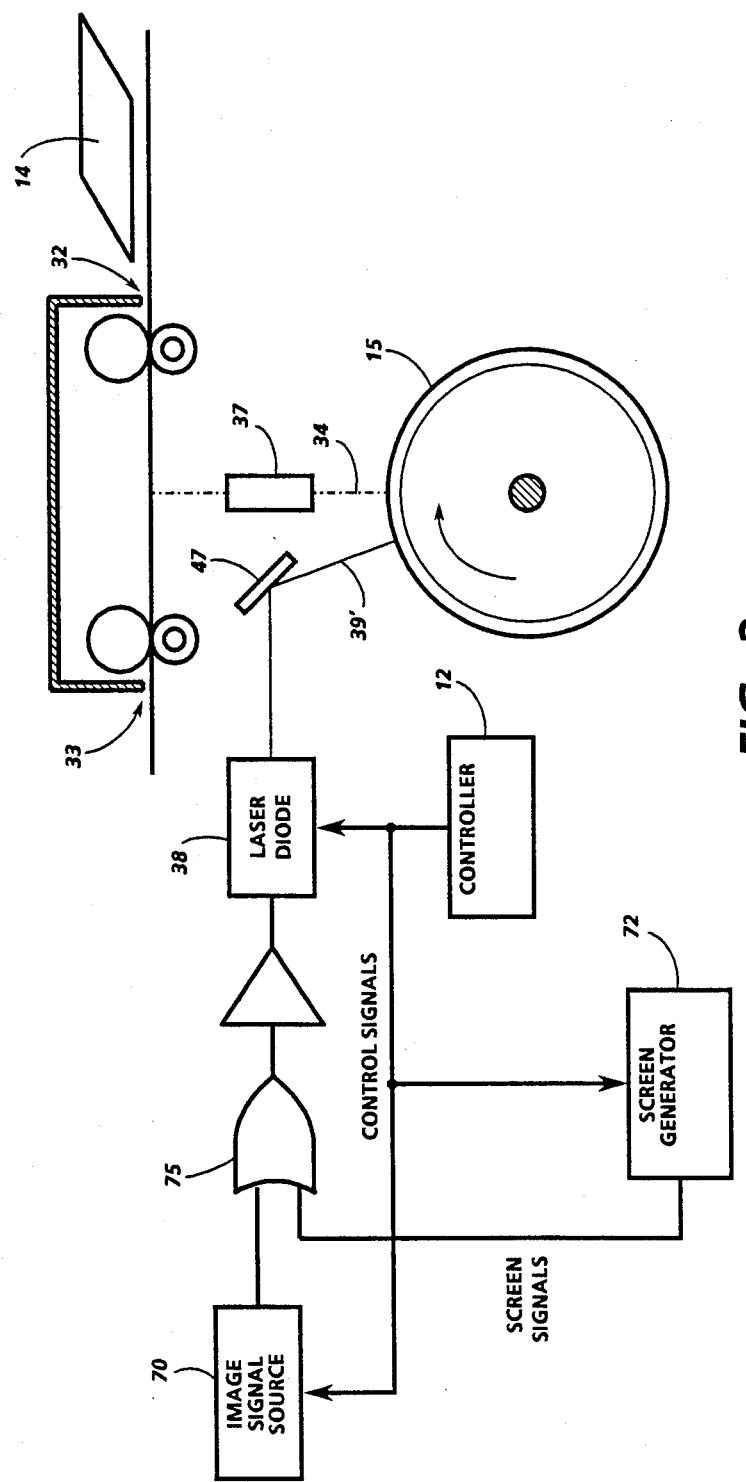
FIG. 2 is a block diagram illustrating the component parts of the halftone screening system of the present invention.
Figure 3:
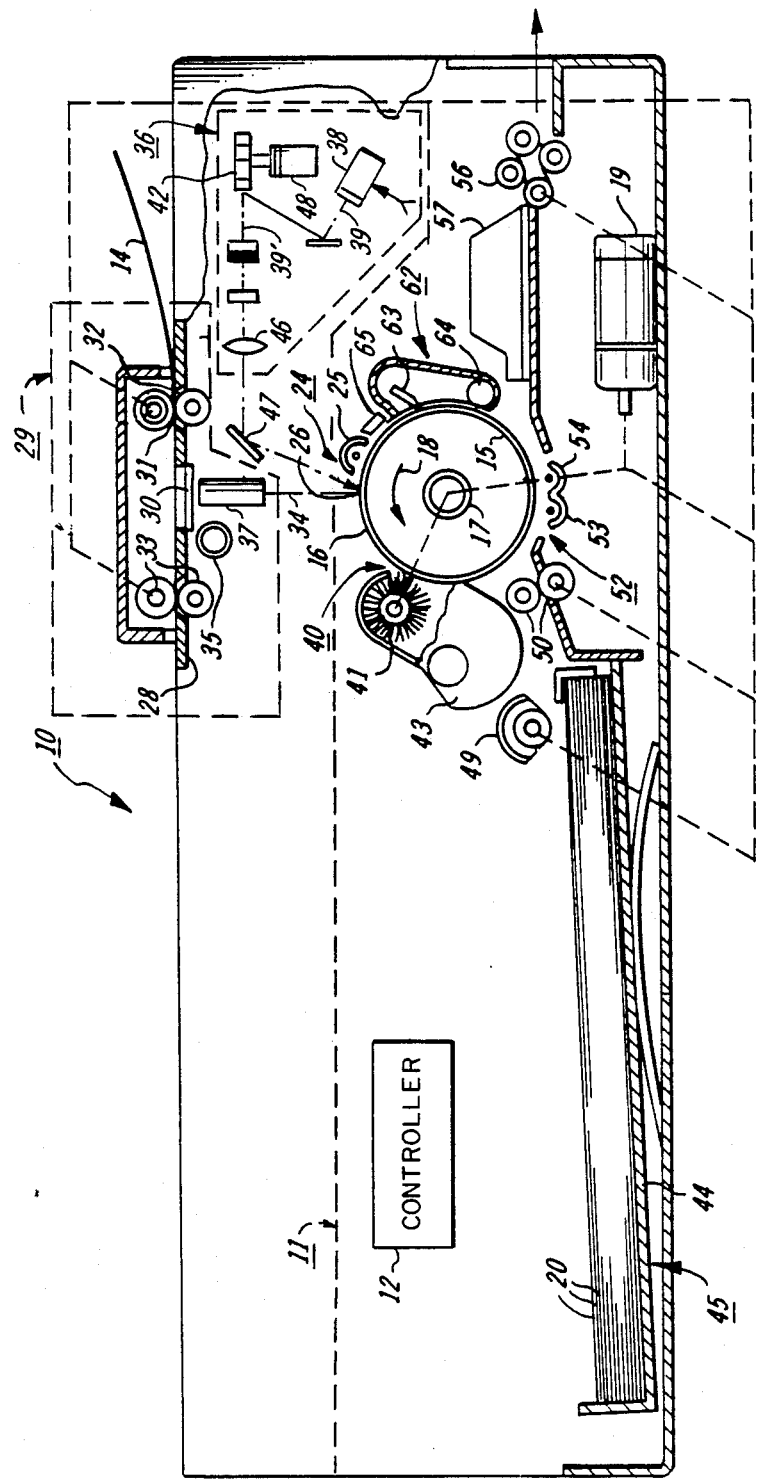
FIG. 3 is a side view of an alternate embodiment in which the raster output scanner beam and the image rays from the light lens system impinge on the recording member at the same point.
Figure 4:
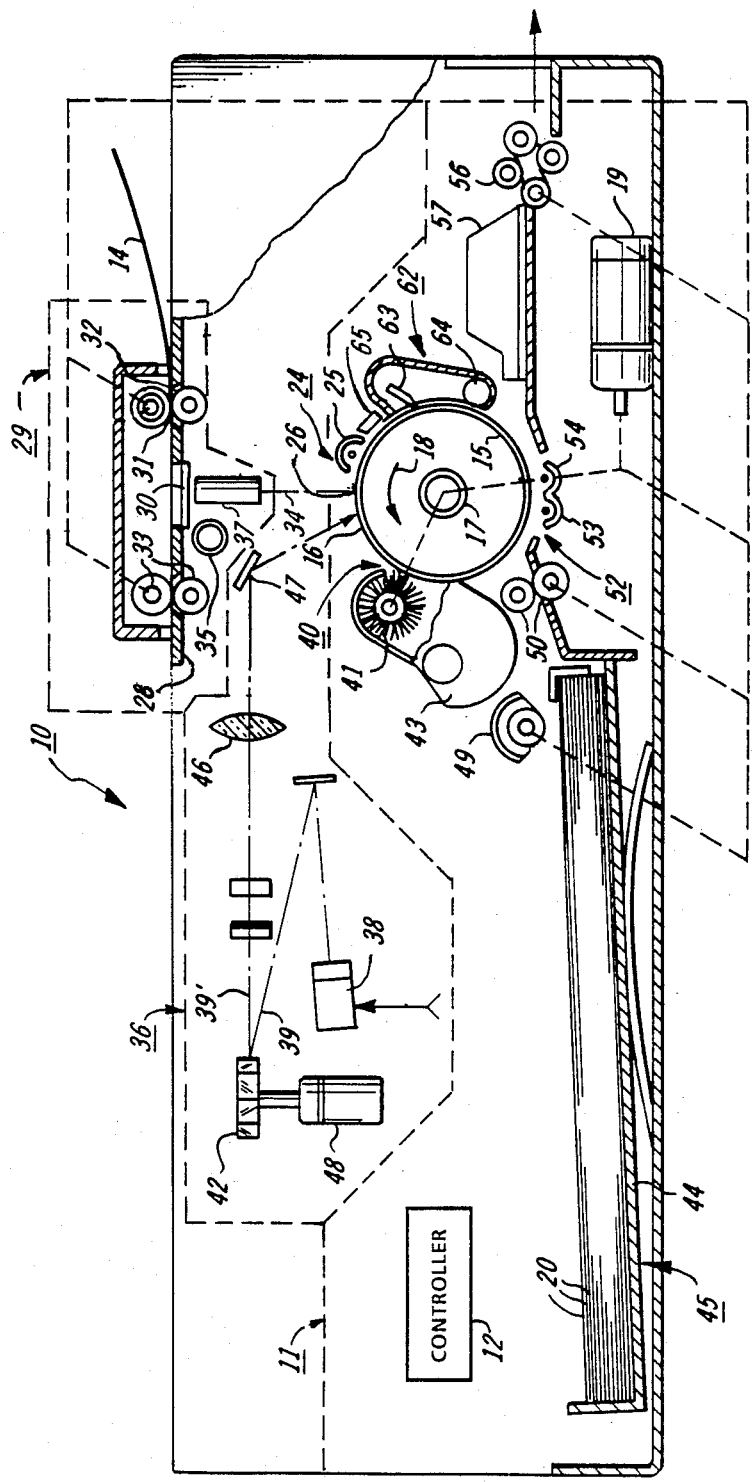
FIG. 4 is a side view of a second alternate embodiment in which the raster output scanner beam impinges on the recording member at a point downstream of the image rays from the light lens system.

Referring to FIG. 2, image signals or pixels may be derived from any suitable source 70 such as a memory, communication line, etc. For operation in the screen mode, screening signals are derived from a screen generator 72. Screen generator 72 may comprise any suitable source of screen signals such as, suitable screen generating hardware, memory, etc. The operation of laser diode 38, image signal source 70, and screen generator 72 are controlled by control signals from controller 12. Suitable means, exemplified here by OR gate 75 are provided to enable input of image signals from image signal source 70 or screen signals from screen generator 72 to the modulator driver of laser diode 38.

OPERATION

Where it is desired to operate copier/printer 10 in the copy mode and make one or more copies of a document 14, xerographic section 11 of copier/printer 10 is first brought to a standby or ready condition. In this condition, motor 19 is energized to rotate photoreceptor 15, magnetic brush roll 41, and roll pairs 50, 56, while fuser 57 is actuated to bring the fuser up to operating temperature. When xerographic section 11 is ready, the leading edge of the document 14 to be copied is inserted into the nip of roll pair 32 of document handler-optic section 29. On a signal from sensor 31 in response to detection of the leading edge of the document, controller 12 engages roll pair 32, 33, causing roll pair 32, 33 to rotate. The document in the nip of roll pair 32 is accordingly fed forward across scan slit 30 and discharged through the nip of roll pair 33. Controller 12 actuates lamp 35 to illuminate scan slit 30 and the line-like portion of the document passing thereover. The resulting light rays 34 reflected from the document as the document passes across slit 30 are projected onto the moving photoreceptor 15, selectively discharging the previously uniformly charged photoconductive surface 16 to create a latent electrostatic image of the document image thereon.

The photoreceptor bearing the latent electrostatic image is thereafter developed by magnetic brush roll 41 with the resulting toner image carried into transfer relation with a sheet of copy sheet 20 advanced forward from the stack of copy sheets in tray 45 by feed rolls 49 and registration roll pair 50 in timed relation thereto. Following transfer, the copy sheet with the toner image is fused by fuser 57 and discharged.

Leftover developer materials on the surface of photoreceptor 15 are removed by cleaning blade 63 while residual charges are neutralized by discharge lamp 65. The cleaned and neutralized surface of photoreceptor 15 is charged by scorotron 25 in preparation for imaging.

Where copier/printer 10 is operated in the print mode, xerographic section 11 is placed in the ready condition described above. Polygon motor 48 of raster output scanner section 36 is actuated to rotate polygon 42 and sweep the beam 39' of high intensity light output by laser 38 across photoreceptor 15. Beam 39', which is modulated in accordance with the image signals from image signal source 70, exposes the moving photoreceptor surface line by line to create a latent electrostatic image in accordance with the image signal input to the modulator driver of laser diode 38. The latent electrostatic image is thereafter developed, transferred to a copy sheet 20, and fused in the manner described heretofore.

Where it is desired to operate copier/printer 10 in the screen mode and provide a screened copy, xerographic section 11, document handler-optic section 29, and raster output scanner section 36 are actuated in the manner described above. In this mode, screen signals from screen generator 72 are input to the modulator driver of laser diode 38 instead of image signals from image signal source 70. The screen signal input provides a dot matrix image in the form of a predetermined screen pattern on the surface of photoreceptor 15 upstream of and hence before exposure of the photoconductive surface 16 of photoreceptor 15 to the light rays 34 derived from scanning document 14.

The subsequent exposure of the partially exposed surface of photoreceptor 15 in effect superimposes the light image of document 14 on the previously formed screen to provide a screened image. The screened latent electrostatic image is thereafter developed, transferred, and fused in the manner described previously.

While the point where beam 39' impinges on the photoconductive surface 16 of photoreceptor 15 is shown and described as being upstream of the point where image rays 34, generated through scanning of the document passing across scan slit 30, impinge on photoreceptor 15, it will be understood that beam 39' may be arranged to impinge on the photoconductive surface 16 of photoreceptor 15 downstream of light rays 34. In that event, during operation in the screening mode, the latent electrostatic image of the document being copied would be created first on the photoconductive surface 16 followed by the dot matrix image of the screen pattern created by scanning beam 39'.

It is further understood that the point of impingement of beam 39' and light rays 34 on the photoconductive surface 16 may be the same. In that event, creation of the dot matrix screen and the electrostatic image of the document being copied would occur substantially simultaneously.

While the invention has been described with reference to the structure disclosed, it is not confined to the details set forth, but is intended to cover such modifications or changes as may come within the scope of the following claims.

I claim:

1. In a copier/printer having a movable recording member on which images are created, developed, and transferred to copy sheets to provide copies and prints, the combination of:
   (a) a raster output scanner for scanning said recording member to write images thereon in accordance with an image signal input,
      said raster output scanner including a beam of high intensity radiation, means for sweeping said beam across said recording member to write said images line by line, and means to modulate said beam in accordance with said image signal input;
   (b) a light/lens system for scanning said recording member to copy the image from an image bearing document thereon,
      said light/lens system including an exposure slit, means for transporting the document across said exposure slit, illumination means for illuminating said exposure slit and the portion of the document thereover, and means for conducting image rays of said document to said recording member;
   (c) a source of image signals which provide an image in the form of a dot matrix screen pattern; and
   (d) control means for actuating both said raster output scanner and said light/lens system in predetermined order so that said raster output scanner writes said dot matrix screen pattern from said image signal source on said recording member and said light/lens system copies said document image on said recording member in overlapping relation to one another whereby to provide a screened copy of said document image.

2. The copier/printer according to claim 1 in which said raster output scanner beam impinges on said recording member upstream of the point where said image rays from said light/lens system impinge on said recording member.

3. The copier/printer according to claim 1 in which said raster output scanner beam impinges on said recording member downstream of the point where said image rays from said light/lens system impinge on said recording member.

4. The copier/printer according to claim 1 in which said raster output scanner beam and said image rays from said light/lens system impinge on said recording member at the same point.

5. In a copier/printer having a movable photoreceptor, means for uniformly charging the photoreceptor, means for developing latent electrostatic images created on the photoreceptor, means for transferring the developed images to a copy substrate material to provide copies and prints of the images, and means for fusing the images transferred to the copy substrate material to provide permanent copies and prints, the combination comprising:
 (a) first scan means for scanning image bearing documents to produce latent electrostatic images of the document images on said photoreceptor for developing, transfer, and fusing whereby to provide permanent copies of said documents;
 (b) second scan means for scanning said photoreceptor to produce latent electrostatic images on said photoreceptor in accordance with an image signal input for developing, transfer, and fusing whereby to provide permanent prints of the images represented by said image signal input;
 (c) a first image signal source;
 (d) a second image signal source, said second image source providing image signals defining at least one dot matrix image comprising a predetermined halftone screen for screening latent electrostatic images produced by said first scan means; and
 (e) control means for actuating both said first and second scan means in timed synchronization with one another whereby image signals from said second image signal source are input to said second scan means so that there is formed on said photoreceptor said latent electrostatic images of the documents scanned together with said dot matrix image of said halftone screen to provide screened images of said documents.

6. In a copier/printer having a movable photoreceptor, means for uniformly charging the photoreceptor, means for developing latent electrostatic images created on the photoreceptor, means for transferring the developed images to a copy substrate material to provide copies and prints of the images, and means for fusing the images transferred to the copy substrate material to provide permanent copies and prints, the combination comprising:
 (a) first scan means for scanning image bearing documents to produce latent electrostatic images of the document images on said photoreceptor for developing, transfer, and fusing whereby to provide permanent copies of said documents;
 (b) second scan means for scanning said photoreceptor to produce latent electrostatic images on said photoreceptor in accordance with an image signal input for developing, transfer, and fusing whereby to provide permanent prints of the images represented by said image signal input;
 (c) a first image signal source;
 (d) a second image signal source, said second image source providing image signals defining at least one dot matrix image comprising a predetermined halftone screen for screening latent electrostatic images produced by said first scan means; and
 (e) control means for selectively actuating said first scan means to produce only copies of said documents, said second scan means to produce only prints in response to image signals from said first image signal source, or both said first and second scan means to cause said second scan means to provide said halftone screen in response to said image signals from said second image signal source for screening the images produced by said first scan means.

* * * * *